US008023091B2

(12) United States Patent
Kim (10) Patent No.: US 8,023,091 B2
(45) Date of Patent: Sep. 20, 2011

(54) LIQUID CRYSTAL DISPLAY DEVICE HAVING SPACER COMPRISING LIQUID PHASE MATERIAL AND FABRICATING METHOD THEREOF

(75) Inventor: Young Suk Kim, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 1083 days.

(21) Appl. No.: 11/203,460

(22) Filed: Aug. 12, 2005

(65) Prior Publication Data

US 2006/0125976 A1 Jun. 15, 2006

(30) Foreign Application Priority Data

Dec. 14, 2004 (KR) .................. 10-2004-0105584

(51) Int. Cl.
*G02F 1/1339* (2006.01)
*G02F 1/1333* (2006.01)
(52) U.S. Cl. .................. 349/155; 349/86; 349/88
(58) Field of Classification Search .............. 349/90, 349/155, 86–88
See application file for complete search history.

(56) References Cited

U.S. PATENT DOCUMENTS

| | | | |
|---|---|---|---|
| 5,499,128 A * | 3/1996 | Hasegawa et al. | 349/155 |
| 5,530,567 A * | 6/1996 | Takei | 349/86 |
| 6,507,385 B1 * | 1/2003 | Nishiyama et al. | 349/156 |
| 6,551,667 B2 * | 4/2003 | Kubota et al. | 428/1.1 |
| 2007/0009677 A1 * | 1/2007 | Ebisu et al. | 428/1.54 |

FOREIGN PATENT DOCUMENTS

| | | |
|---|---|---|
| JP | 07-013138 | 1/1995 |
| JP | 2001-166318 | 6/2001 |
| JP | 2003-241199 | 8/2003 |

OTHER PUBLICATIONS

Office Action issued in corresponding Korean Patent Application No. 10-2004-0105584, mailed Mar. 18, 2011.

* cited by examiner

*Primary Examiner* — Nathanael R Briggs
(74) *Attorney, Agent, or Firm* — Brinks Hofer Gilson & Lione

(57) ABSTRACT

A liquid crystal display device and fabricating method thereof are disclosed by which a cell gap can be uniformly maintained, regardless of temperature variation, across an LCD panel. Opposing substrates are spaced apart with a prescribed gap using spacers and liquid crystals in the gap between the substrates. The spacers are provided on either or both of the substrates. The spacers contain an organic resin within which a liquid phase material or liquid crystals is dispersed. The liquid phase material or liquid crystals may be encapsulated. The thermal expansion coefficient of the material is substantially equal to or greater than that of the liquid crystals in the gap between the substrates. The thermal expansion coefficient of the column spacer is substantially equal to or greater than that of the liquid crystals in the gap between the substrates.

9 Claims, 9 Drawing Sheets

LIQUID CRYSTAL DISPLAY DEVICE HAVING SPACER COMPRISING LIQUID PHASE MATERIAL AND FABRICATING METHOD THEREOF

This application claims the benefit of the Korean Patent Application No. P2004-105584, filed on Dec. 14, 2004, which is hereby incorporated by reference as if fully set forth herein.

FIELD OF THE INVENTION

The present invention relates to a liquid crystal display device, and more particularly, to a liquid crystal display device and fabricating method thereof. Although the present invention is suitable for a wide scope of applications, it is particularly suitable for maintaining a uniform cell gap across a panel regardless of a temperature change by modifying a shape of a spacer.

DISCUSSION OF THE RELATED ART

With the advent of an information-oriented society, the demands for display devices have been continually increasing. Much effort has been made to research and develop various flat panel display devices such as LCD (liquid crystal display), PDP (plasma display panel), ELD (electroluminescent display), VFD (vacuum fluorescent display) devices and the like. Some of the flat panel displays have been already used as displays in electronic equipment.

Among those flat panel displays, the LCD, which has advantage such as being lightweight, having a slim size and having low power consumption, has been widely used for a mobile image display to replace CRT (Cathode Ray Tube). Moreover, the LCD is being developed to be applicable to various fields for a TV monitor, a computer monitor and the like to receive and display broadcast signals.

In order to be applicable to various field as a general image display device, it is desirable for the liquid crystal display device to implement high quality images with high definition, high luminance and wide area, etc. as well as maintaining the advantageous LCD characteristics of lightness, slimness and low power consumption.

A liquid crystal display device according to a related art is explained with reference to the attached drawings as follows.

Figure 1:
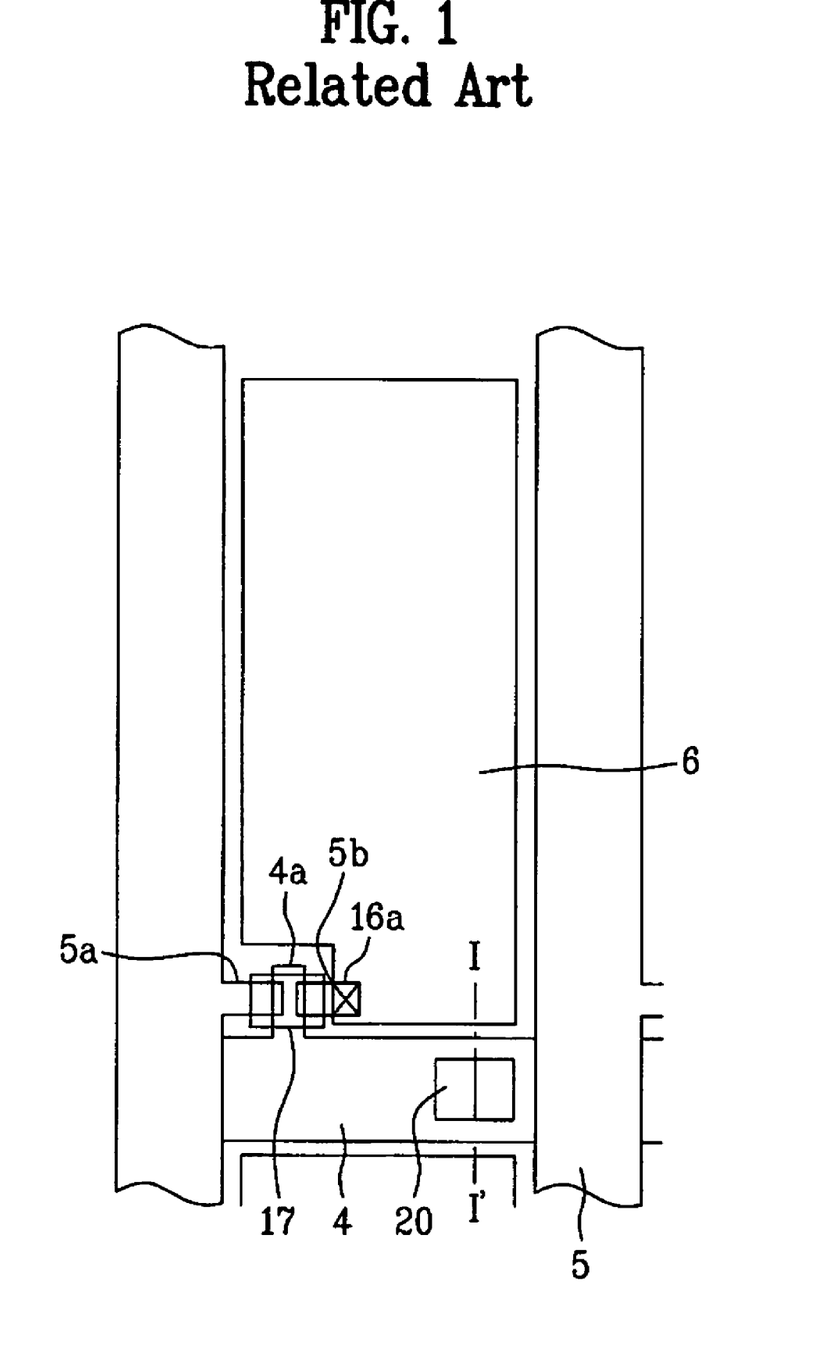
FIG. 1 is a layout of a liquid crystal display device according to a related art.
Figure 2:
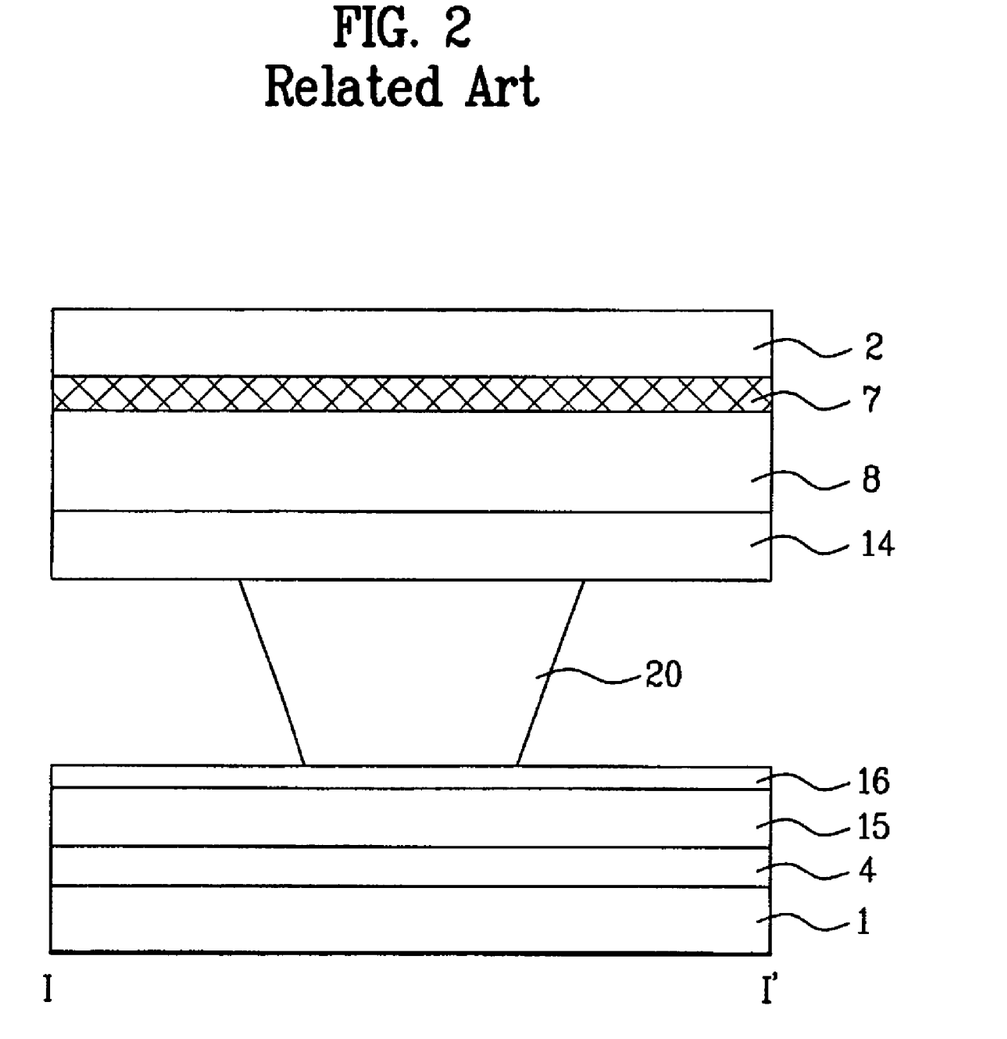
FIG. 2 is a cross-sectional diagram taken along a cutting line I~I' in FIG. 1.

FIG. 1 is a layout of a liquid crystal display device according to a related art and FIG. 2 is a cross-sectional diagram taken along a cutting line I~I' in FIG. 1.

Referring to FIG. 1 and FIG. 2, a liquid crystal display device according to a related art consists of a first substrate 1, a second substrate 2, and a liquid crystal layer (not shown in the drawing) injected between the first and second substrates 1 and 2. The first and second substrates 1 and 2 are bonded together to have a predetermined gap therebetween. The first substrate, second substrate and liquid crystal layer are called a liquid crystal display panel (LCD panel).

In the related art liquid crystal display device, a column spacer 20 is provided to an area corresponding to a line area of the first substrate 1 to support the first and second substrates 1 and 2. In other liquid crystal display devices, randomly spaced ball spacers (not shown in FIG. 1) are used to support the first and second substrates 1 and 2 instead of the column spacer.

In particular, on an array area on the first substrate 1 of the related art liquid crystal display device shown in FIG. 1, a gate line 4 and a data line 5 are formed to vertically cross with each other to define a pixel area. A thin film transistor (TFT) is formed on an intersection between the gate line 4 and the data line 5. A pixel electrode 6 is formed on the pixel area.

The thin film transistor consists of a gate electrode 4a protruding from the gate line 4, a semiconductor layer 17 covering the gate electrode 4a, a source electrode 5a protruding from the data line 5 to be overlapped with one side of the semiconductor layer 17, and a drain electrode 5b opposing the source electrode 5a with a predetermined interval to be overlapped with the other side of the semiconductor layer 17.

The gate line 4 is formed on the first substrate 1. A gate insulating layer 15 is formed on an entire surface of the substrate including the gate line 4. A protective layer 16 is formed on the gate insulating layer 15. A contact hole 16a is formed by removing a predetermined portion of the protective layer 16 on the drain electrode 5b to electrically connect the pixel electrode 16 and the drain electrode 5b together.

On the second substrate 2 confronting the first substrate 1, a black matrix layer 7 blocking a non-pixel area (gate line, data line and thin film transistor area) excluding the pixel area, a color filter layer 8, and a common electrode 14 are formed. The color filter layer 8 includes R, G and B pigments corresponding to the pixel areas, respectively is formed on the second substrate 2 including the black matrix layer 7. The common electrode 14 is formed over an entire surface of the second substrate 2 including the color filter layer 8. Moreover, a plurality of column spacers 20 are formed on prescribed portions of the common electrode 14 to sustain a cell gap.

A plurality of the column spacers 20 are uniformly spaced apart from each other to support the bonded first and second substrates 1 and 2. The column spacers 20 are provided to correspond to the gate line 4.

In the above-configured related art liquid crystal display device, gravity failure is observed at high temperature (higher than about 20° higher than that of the external environment) if the gap between the first and second substrates 1 and 2 is excessively filled up with liquid crystals. In general, gravity failure takes place at an edge of the LCD panel in the vicinity of the ground. If the LCD panel is upright at high temperature, liquid crystals are concentrated on a part in the vicinity of the ground so that a portion of the liquid crystals in the vicinity of the ground becomes convex due to the expansion of the liquid crystals. This swelling is called gravity failure.

The more the liquid crystals are injected between the first and second substrates or the higher the temperature of the environment of the LCD panel is raised, the gravity failure becomes worse.

Figure 3:
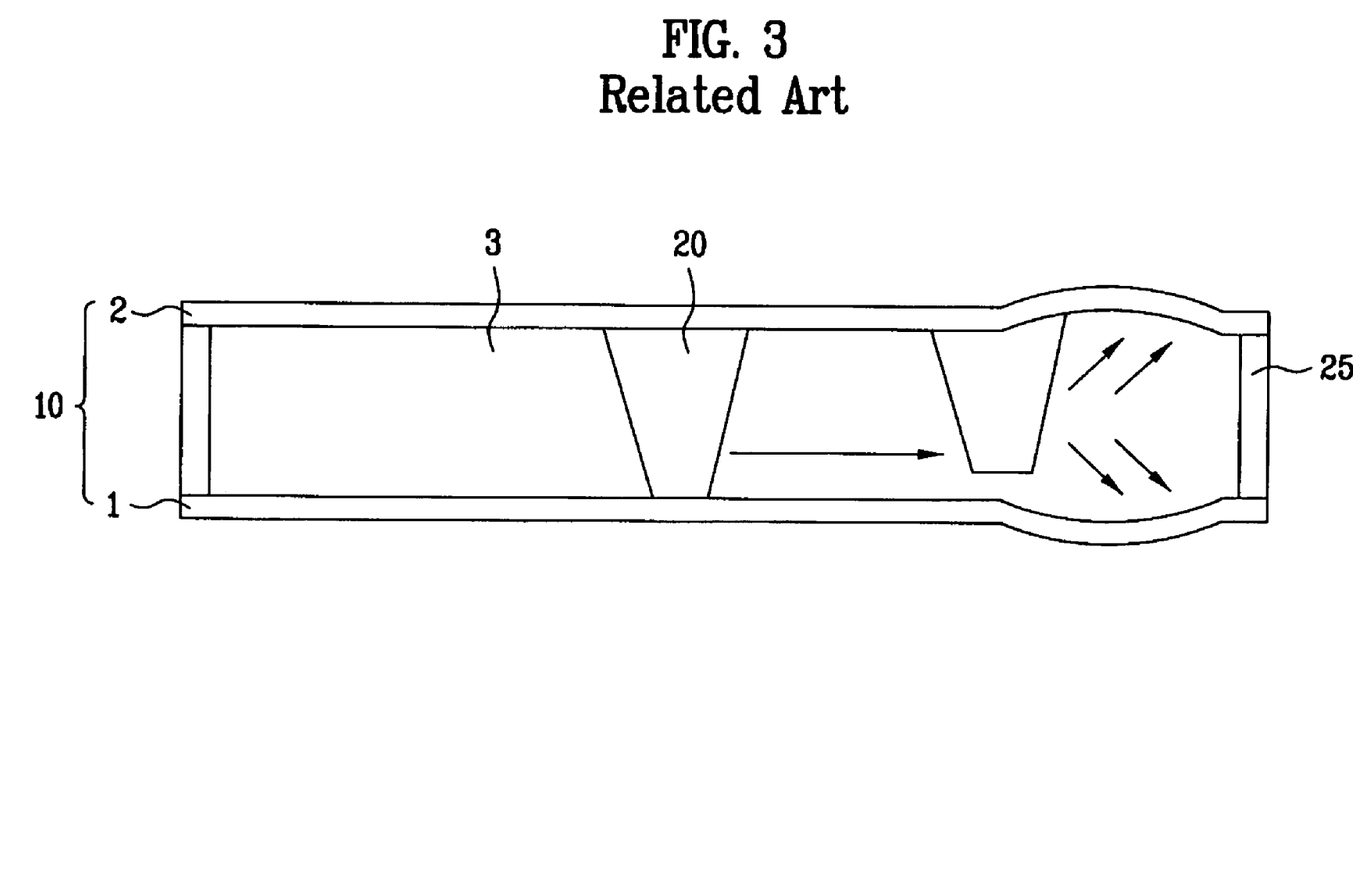
FIG. 3 is a diagram for explaining gravity failure.

FIG. 3 is a diagram for explaining gravity failure.

Referring to FIG. 3, if an LCD panel 10 stands upright and an environmental temperature of the LCD panel 10 rises, liquid crystals 3 flow down to an edge area of the LCD panel 10 in the vicinity of the ground to be saturated. If the temperature rises higher, the liquid crystals 3 expand so that the cell gap 3 is extended by the liquid crystals 3 existing in the saturated portion. Once gravity failure occurs, a light path difference exists between a portion having a normal cell gap and another portion having an extended cell gap. In this case, an opaque stain is observed at the edge of the LCD panel having the extended cell gap.

In looking into a cross-section of the first and second substrates 1 and 2 of the LCD panel 10, thermal expansion of a column spacer 20 located at the edge of the LCD panel 10 is smaller than that of the liquid crystals in case of gravity failure. Due to the extended cell gap at the edge of the LCD panel 10, column spacers 20 located at the lower edge of the LCD panel 10 fail to support the first and second substrates 1 and 2 and are separated from the first substrate 1 (assuming that the column spacers 20 are provided to the second substrate 2).

In the LCD panel, different areas are defined: a display area in which images are displayed is in a central part of the LCD panel 10 and non-display area where a drive unit is provided is at a periphery of the display area. In this case, a seal pattern 25 is provided in a boundary between the display area and the non-display area to bond the first and second substrates 1 and 2 together. The display area of the first and second substrates 1 and 2 within the seal pattern 25 is filled up with the liquid crystals 3 to form a liquid crystal layer 3.

However, the related art liquid crystal display has the following problems.

First of all, the liquid crystal layer can be formed between the upper and lower substrates of the LCD panel by liquid crystal injection or dropping. In the liquid crystal injection method, liquid crystals are sucked into the panel by a capillary action working within the panel in a vacuum state. In the liquid crystal dropping method, a predetermined quantity of liquid crystals is dropped onto one of the substrates to charge the panel.

In a wide-area panel, the liquid crystal dropping method is preferred to the liquid crystal injection method due to problems of productivity shortage and lowered speed. In this case, the liquid crystal dropping method is carried out by dropping an optimally calculated quantity of liquid crystals on a substrate. If an incorrectly calculated quantity of the liquid crystals is dropped due to internal variation of the panel, display quality degradation of the panel occurs if there is an insufficient quantity of the liquid crystals or gravity failure occurs if there is an excessive quantity of the liquid crystals.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As discussed above, with liquid crystal display devices of increasing area, liquid crystal dropping is primarily used for manufacturing throughput. If an excessive amount of liquid crystals are dropped within an LCD panel, gravity failure is observed on an edge of an upright LCD panel. The gravity failure causes the separation of the substrates so that the column spacers no longer sustain a uniform cell gap throughout the LCD panel.

The column spacers are generally formed of an organic resin and are formed on a color filter array substrate. The organic resin undergoes a thermal- or photo-hardening process after patterning to maintain a cell gap between the color filter array and a TFT array substrate.

If an LCD panel including the column spacers is put under a condition of high temperature, liquid crystals between two substrates of the LCD panel and the column spacers supporting the two substrates expand together. However, the thermal expansion coefficient of the liquid crystals is at least twice that of the solid-state column spacers. In one example, the thermal expansion coefficient of the column spacers are 20~50% of that of liquid crystals. So, each column spacer expands at a lower than that of the liquid crystals due to the thermal expansion coefficient difference. If the LCD panel is put under the condition of high temperature, nonuniformity of a per-area cell gap occurs between a liquid crystal area having the higher thermal expansion and a column spacer area having the lower thermal expansion.

Moreover, if the LCD panel is put under a condition of high temperature, liquid crystals are arranged random between two substrates. So, it is highly probable that liquid crystals tend to expand in all directions. The column spacers, on the other hand, which are formed on one substrate to contact the other substrate by pressurization to support the two substrates, have horizontal expansion but almost no vertical expansion. Thus, the nonuniformity of the cell gap becomes considerable due to both the physical property difference and the pressure differently on the liquid crystals and the column spacers.

A liquid crystal display device and fabricating method thereof according to the present invention are explained with reference to the attached drawings as follows.

Figure 4:
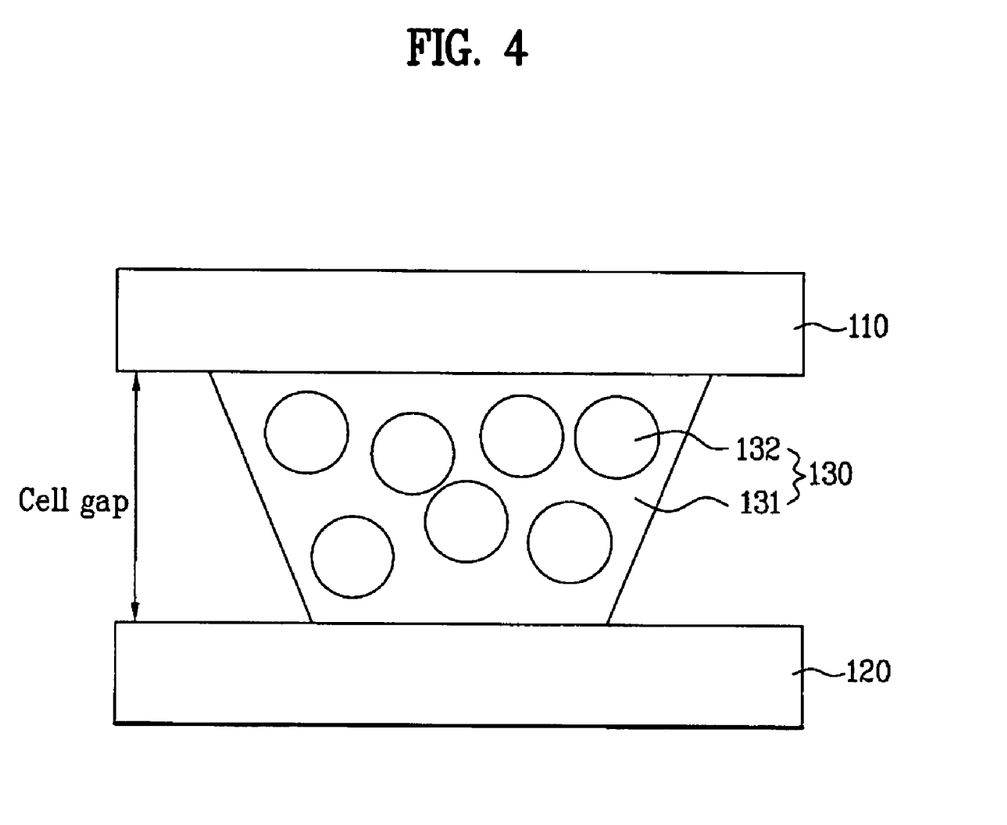
FIG. 4 is a cross-sectional diagram of a liquid crystal display device according to a first embodiment of the present invention.

FIG. 4 is a cross-sectional diagram of a liquid crystal display device according to a first embodiment of the present invention.

Referring to FIG. 4, a liquid crystal display device according to a first embodiment of the present invention includes a first substrate 110, a second substrate 120 spaced apart from the first substrate 110 with a prescribed gap therebetween, and a spacer 130 on the first substrate 110. In this case, the spacer 130 includes a hardened organic resin 130 having a dispersed liquid phase material 132 inside. The remaining area between the first and second substrates 110 and 120 is filled with liquid crystals (not shown in the drawing).

The liquid phase material 132, which has a thermal expansion coefficient substantially equal to or greater than that of the liquid crystals, is dispersed within the hardened organic resin 131 raise the thermal expansion coefficient of the spacer 130. Hence, the liquid phase material 132 expands the spacer 130 to a level similar to that of the liquid crystals between the first and second substrates 110 and 120 at high temperature.

The organic resin 131 is a photo-hardening resin hardened by light. A light source causing the hardening may emit ultraviolet or visible radiation. If necessary, heat can be added to the hardening process.

In this case, a height of the hardened organic resin 131 including the liquid phase material 132 between the first and second substrates 110 and 120 is defined as a cell gap.

A method of fabricating a column spacer of a liquid crystal display device according to a first embodiment of the present invention is explained with reference to the attached drawings as follows.

Figure 5A:
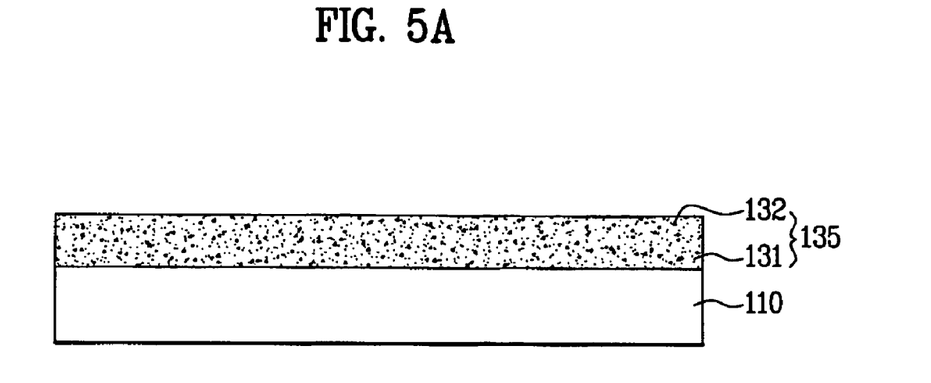
FIGS. 5A to 5C are cross-sectional diagrams of a method of fabricating a column spacer of a liquid crystal display device according to a first embodiment of the present invention.
Figure 5B:
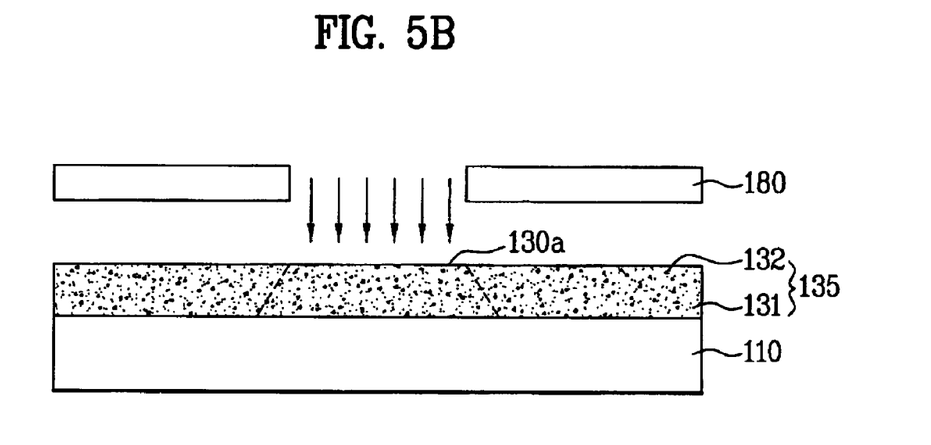
Figure 5C:
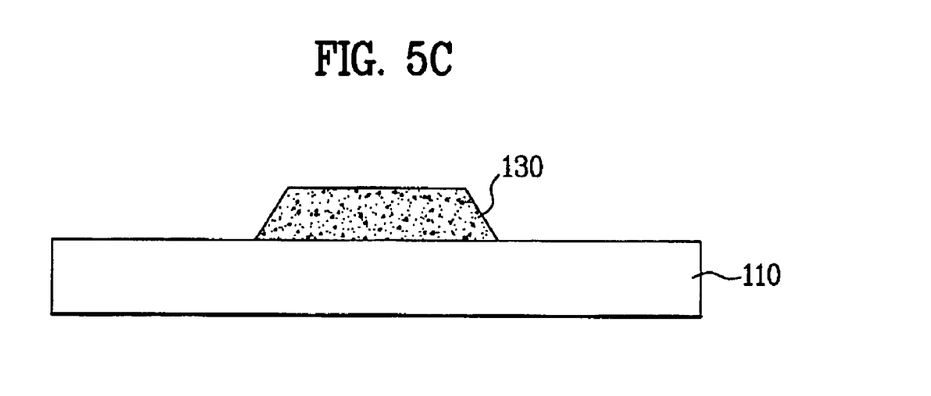

FIGS. 5A to 5C are cross-sectional diagrams of a method of fabricating a column spacer of a liquid crystal display device according to a first embodiment of the present invention.

Referring to FIG. 5A, a first substrate 110 having a color filter array (not shown in the drawing) thereon is prepared. Subsequently, a material layer 135 is coated on an entire surface of the first substrate 110. In this case, the material layer 135 includes an organic resin 131 in which a liquid phase material 132 having a thermal expansion coefficient substantially equal to or greater than that of liquid crystals, which will fill a space between the first and second substrates, is dispersed at a prescribed dispersion rate. The material layer 135 is formed by spin coating similar to that of a photosensitive or color filter layer.

Referring to FIG. 5B, a mask 180 having a predetermined opening is aligned over the first substrate 110 having the material layer 135 coated thereon. An exposed portion 130a of the material layer 135 is hardened via the opening and the rest area maintains its physical property as coated. The exposed portion 130a of the material layer 135 is exposed to UV or visible radiation via the mask 180.

In exposure, the exposed portion 130a chemically reacts to be polymerized by the light while the liquid phase material 132 within the exposed portion 130a maintains its liquid phase to be dispersed within the organic resin 131.

Meanwhile, it is assumed that the organic resin 131 shown in FIG. 5A or FIG. 5B is a negative photo-hardening resin to harden its exposed portion. If the organic resin is a positive photo-hardening resin, the exposure is carried out using a mask having an opening pattern inverse to that of the mask described previously.

Referring to FIG. 5C, the remaining area of the material layer 135 that is not hardened is removed by a developer to form a spacer 130.

Liquid crystals used for the liquid crystal display panel has liquid properties and crystalline solid properties. The thermal expansion coefficient normally increases as the phase changes from solid to liquid or from liquid to gas. Thus, liquid crystals tend to have a thermal expansion coefficient between that of solid and gas.

The liquid phase material used for the liquid crystal display device according to the first embodiment of the present invention is formed of a material having a thermal expansion coefficient substantially equal to or greater than that of liquid crystals dropped within the liquid crystal display device. For instance, the liquid phase material can be formed of water. The thermal expansion coefficient can be selected by considering a dispersion ratio within the organic resin 131. For instance, if a considerable quantity of the liquid phase material 132 is included in the organic resin 131, a liquid having a thermal expansion coefficient having a relatively smaller difference from that of the liquid crystals is used. If a small quantity of the liquid phase material 132 is included in the organic resin 131, a liquid having the thermal expansion coefficient considerably greater than that of the liquid crystals is used.

If the liquid phase material 132 is included within the organic resin 131, a diameter of each drop of the liquid phase material 132 included in the organic resin 131 is 3~4 nm. The organic resin 131 is formed of a material having elasticity to extend when liquid phase materials inside are expanding at high temperature.

Hence, in the liquid crystal display device according to the first embodiment of the present invention, when the liquid crystals are expanding under the condition of high temperature, the organic resin 131 including the liquid phase material 132 are expanding to the same or similar extent to extend the cell gap of the LCD panel overall. So, the cell gap difference per each area becomes insignificant, problems such as stains and the like are minimized.

In the liquid crystal display device according to the first embodiment of the present invention, by adjusting the thermal expansion coefficients of the liquid crystals and the column spacer 130 to the same or similar level, the cell gaps of the area having the liquid crystals only and the cell gap of the area having the column spacer 130 are evenly increased or decreased regardless of the temperature change. Therefore, a step difference between the cell gaps across the entire areas can be lowered.

Alternatively, the liquid phase material included in the organic resin in the first embodiment of the present invention can be replaced by liquid crystals that bring about phase transition at high temperature. In this case, the liquid crystals included in the organic resin (second liquid crystals) have a dielectric constant smaller than that of the liquid crystals filling the space between the first and second substrates (first liquid crystals). This minimizes the effect on the driving of the second liquid crystals. The thermal expansion coefficient of the second liquid crystals is set substantially equal to or greater than that of the first liquid crystals.

If the LCD panel is under high temperature conditions, there exists a cell gap expansion of the same or similar level in each area of the LCD panel to remove the cell gap difference between the respective areas of the LCD panel. Hence, the cell gaps can be uniformly provided.

A reliability test is carried out before marketing the liquid crystal display device. The reliability test checks whether the LCD panel performs satisfactorily at high temperature. In doing so, it is assumed that the first liquid crystals have a phase transition temperature Tni higher than that of the reliability test temperature. Since the second liquid crystals do not affect driving of the first liquid crystals, a phase transition temperature of the second liquid crystals can be set to the temperature of the reliability test. Generally, the reliability test is carried out at 50~60° C. for relatively smaller liquid crystal panels (up to about 40" panels) and up to about 70° C. for larger liquid crystal panels. In this case, the phase transition temperature of the first liquid crystals is 70° C. or higher.

If the phase transition temperature of the second liquid crystals lies within the reliability test temperature, the second liquid crystals within the organic resin lose crystalline property to expand in volume while the reliability test is carried out.

A test condition of gravity failure is determined not to allow the first liquid crystals included within the LCD panel to undergo phase transition. After completion of the phase transition of the liquid crystals, the crystalline property of the liquid crystals is irreversible at normal temperature once the liquid crystals turn into liquid at high temperature.

The second liquid crystals included within the organic resin have a thermal expansion coefficient higher than that of the first liquid crystals filling the space between the first and second substrate. This is because the liquid crystals included within the organic resin are mixed within a corresponding area configuring the column spacer with a prescribed dispersion ratio. Hence, when the liquid crystals are included in the organic resin, the dispersion ratio and thermal expansion coefficient are able to be selected so that the thermal expansion coefficient of the column spacer is substantially equal to that of the liquid crystals.

In the above-described embodiment, in selecting the liquid phase material or the dispersion ratio of the liquid crystals, if the dispersion ratio is too high, the rigidity of the column spacer is lowered, which degrades the endurance of the column spacer. If the dispersion ratio is too low, it is difficult to raise the thermal expansion coefficient of the column spacer. These two conditions are taken into consideration in the selection.

Figure 6:
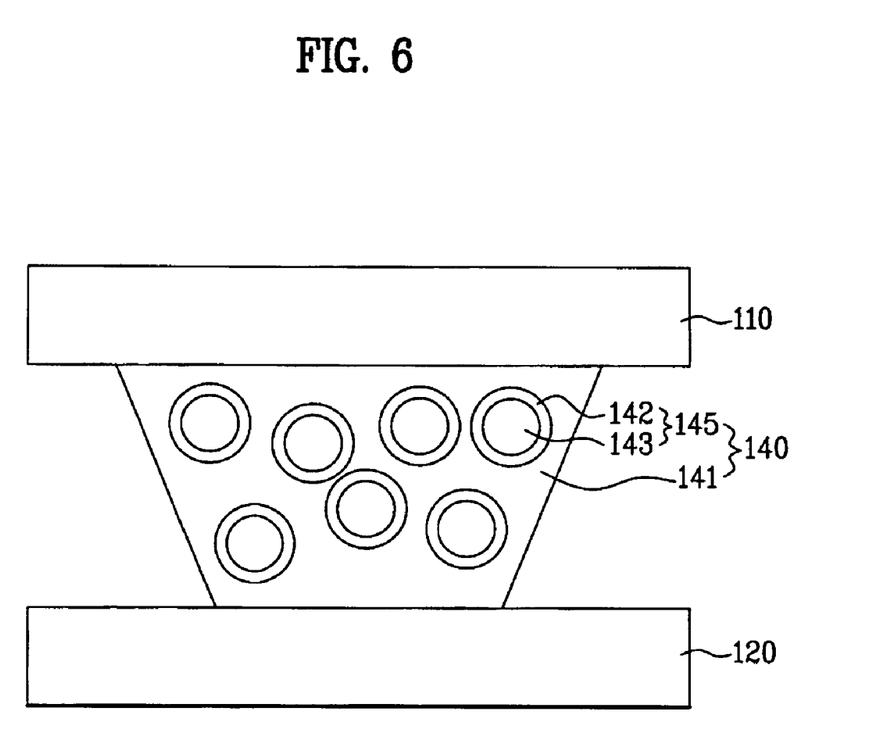
FIG. 6 is a cross-sectional diagram of a liquid crystal display device according to a second embodiment of the present invention.

FIG. 6 is a cross-sectional diagram of a liquid crystal display device according to a second embodiment of the present invention.

Referring to FIG. 6, in a liquid crystal display device according to a second embodiment of the present invention, a column spacer 140 is formed by mixing an organic resin 141 as a main material with microcapsules 145.

In this case, each of the microcapsules 145 includes a wall material 142 and a liquid phase material 143 having a high thermal expansion coefficient within the wall material 142. The liquid phase material 143 having the high thermal expansion coefficient can be the same material explained in the first embodiment. The wall material 142 is used to encapsulate liquid phase material 143 that is unable to exist as self-contained micro-sized liquid phase material within the organic resin.

In general, encapsulation is to enclose an outside of a micro-sized useful material (functional material) with a wall material and is classified into macro-encapsulation, micro-encapsulation and nano-encapsulation according to the size of the encapsulated material. Encapsulation protects the internal material against an external environment of light, oxygen, moisture and the like to prevent breakage and loss of components due to UV-radiation, oxidation and the like, to enhance product stability, to facilitate handling of a dangerous or vulnerable material by isolating a highly reactive or toxic material, and to isolate the material from neighboring material.

A capsule used in the second embodiment of the present invention is a microcapsule 145 having a unit size below 1 μm. The column spacer 140 including the hardened organic resin 141 having the microcapsules 145 inside has a height of 2~5 μm cell gap. To include the microcapsules 145 within the organic resin 141, each of the microcapsules has a size below 1 μm to be easily trapped within the column spacer 140 and to facilitate expansion control of the formed column spacer.

A method of fabricating a column spacer in a liquid crystal display device according to a second embodiment of the present invention is explained as follows (cf. FIGS. 5A to 5C). A color filter array having a color filter array that includes a black matrix layer, a color filter layer and an overcoat layer (or common electrode) is prepared. An liquid-phase organic resin including microcapsules is coated on an entire surface of the color filter array substrate. A predetermined portion of the liquid-phase organic resin is exposed and hardened. The liquid-phase organic resin is then developed to form a column spacer by leaving the exposed and hardened portion of the organic resin only.

In the above-explained embodiments of the present invention, by including the liquid phase material within the organic resin configuring the column spacer or by forming the column spacer having the thermal expansion coefficient similar to that of the liquid crystals filling the LCD panel together with the microcapsules, the cell gap can be uniformly maintained across the entire areas of the LCD panel.

An IPS (in-plane switching) mode liquid crystal display device and a TN mode liquid crystal display device according to the present invention are explained as follows.

Figure 7:
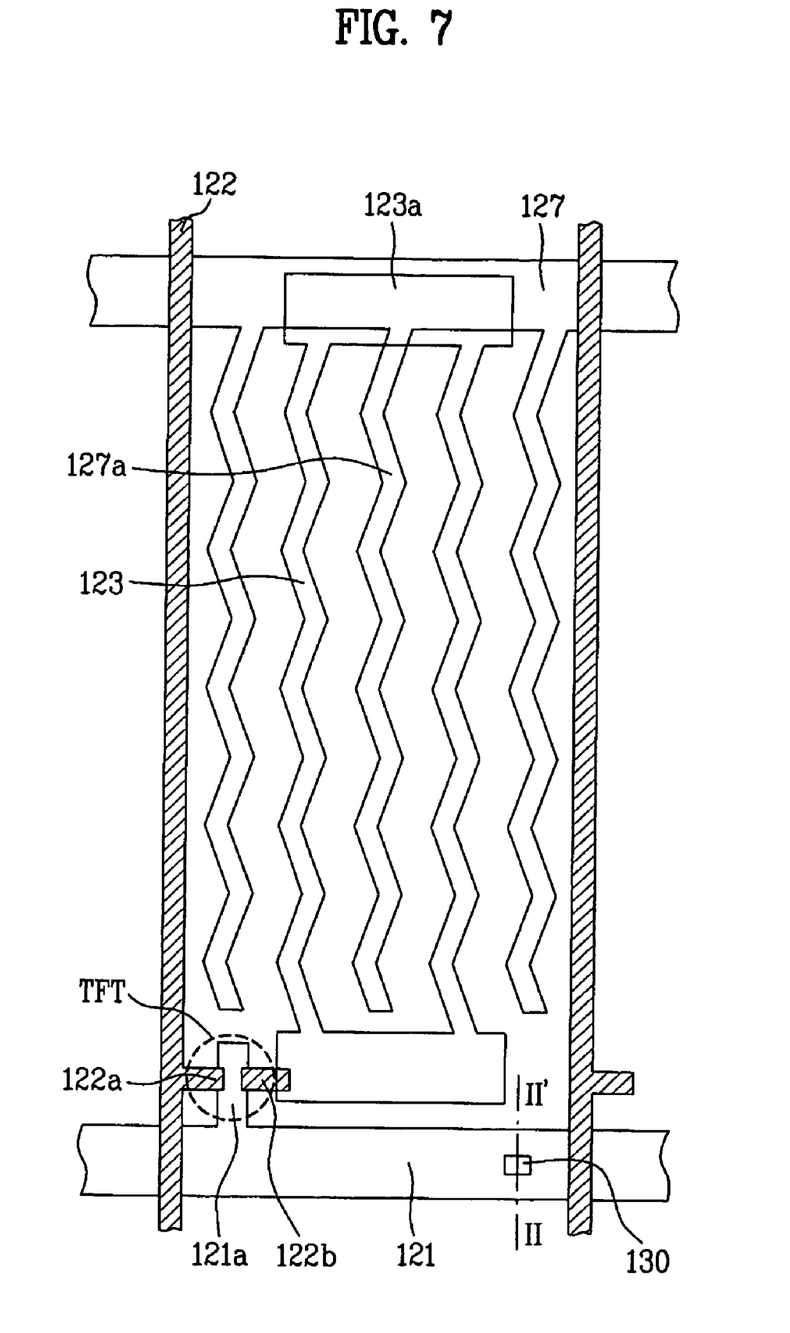
FIG. 7 is a layout of a liquid crystal display device in in-plane switching mode according to the present invention.
Figure 8:
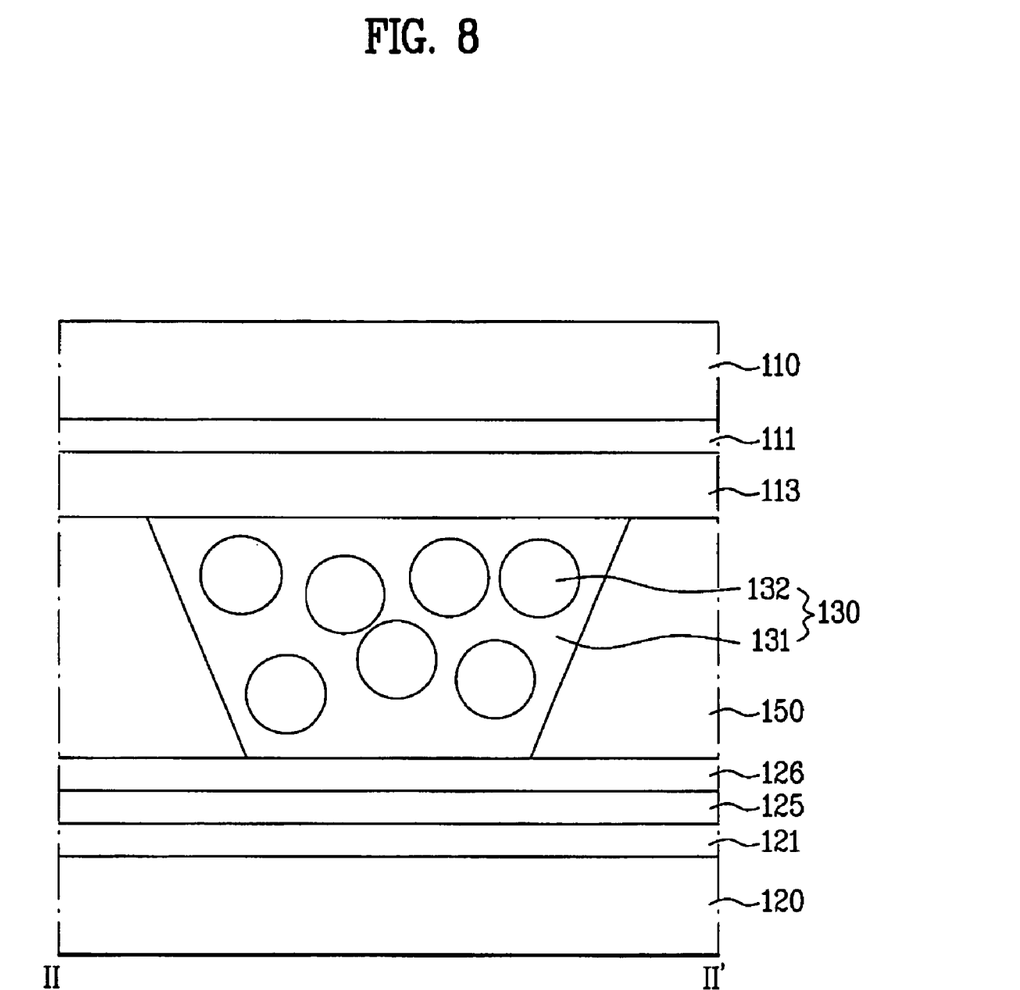
FIG. 8 is a cross-sectional diagram taken along a cutting line II~II' in FIG. 7.

FIG. 7 is a layout of a liquid crystal display device in in-plane switching mode according to the present invention and FIG. 8 is a cross-sectional diagram taken along a cutting line II~II' in FIG. 7. Moreover, FIG. 7 and FIG. 8 show the first embodiment of the present invention.

An IPS mode liquid crystal display device according to the present invention includes a first substrate 110, a second substrate 120, and a liquid crystal layer 150 provided between the first and second substrates 110 and 120. The first and second substrates 110 and 120 are bonded together to have a predetermined gap therebetween.

In particular, on the first substrate 110, a black matrix layer 111 cuts off light from a portion of the LCD panel. This portion includes gate line, data line and thin film transistor areas and excludes a pixel area. A color filter layer (not shown in the drawing) including an R/G/B color film to represent a color that corresponds to each pixel area is formed on the first substrate 110, and an overcoat layer 113 is formed on the black matrix layer 111 and the color filter layer.

A column spacer 130 is formed on a surface of the overcoat layer 113. The column spacer 130 includes an organic resin 131 containing a liquid phase material 132 disposed therein. The organic resin 131 is formed of a material such as a photo-hardening resin and the like. The organic resin 131 of the column spacer 130 can be formed of a photo-sensitive resin such as photo-acryl and the like or polyimide.

A plurality of gate lines 121 and a plurality of data lines 122 are formed on the second substrate 120, which opposes the first substrate 110. The gate and data lines 110 and 120 vertically cross with each other to define a plurality of pixel areas. A pixel electrode 123 and a common electrode 127a are alternately formed on each of the pixel areas to generate a transverse electric field. A thin film transistor is provided to each intersection between the gate and data lines 121 and 122. A common line 127 arranged parallel to the gate line 121 within the pixel and a storage electrode 123a extending from the pixel electrode 123 to be overlapped with an upper part of the common line 127 are further provided to the second substrate 120.

The common line 127 and the common electrode 127a are integral with each other. The common line 127 and the common electrode 127a are also formed together with the gate line 121. The common line 127 and the common electrode 127a are formed of a low resistance metal such as Cu, Al, Cr, Mo, Ti and the like.

As shown, the pixel electrode 123 alternates with the common electrode 127a. The pixel electrode 123 can be formed together with the data line 122 or can be formed on a layer different from the data line. Each of the common electrode 127a and the pixel electrode 123 can be formed as a straight line or in a curved or zigzag shape, the last of which is shown in FIG. 7.

An insulating layer is provided between the common electrode 127a and the pixel electrode 123. This insulating layer may be formed from the same material as (and at the same time as) the gate insulating layer 125 or the protective layer 126 shown in FIG. 8.

A method of fabricating an IPS mode liquid crystal display device according to the present invention is explained as follows.

The black matrix layer 111 is formed. Subsequently, the color filter layer (not shown in the drawing) including the R/G/B color film to represent a color to correspond to each pixel area is formed to partially overlap the black matrix layer 111. The overcoat layer 113 is formed on the first substrate 110 including the black matrix layer 111 and the color filter layer.

The liquid phase material including the organic resin within which the liquid phase material is included is spin-coated on a surface of the overcoat layer 113 to have a predetermined thickness. The organic resin is hardened by light. Since the material is photo-sensitive to light of an exposure process, a separate photosensitive layer is not used when the column spacer is defined by an exposure process.

After exposure is carried out on the organic resin including the liquid phase material using a mask, development is carried out on the organic resin using a development solution to leave the exposed portion of the organic resin only if the organic resin is negatively photosensitive. If the organic resin is positively photosensitive, a pattern of the mask is inversed so that an unexposed portion is left to form the column space of the same shape. In this case, since the exposed portion of the organic resin is hardened, only the hardened portion remains after development.

Subsequently, the patterned column spacer is hardened by UV radiation or heat. In doing so, the liquid phase material within the organic resin maintains its liquid phase.

The above fabricating method has been explained in the explanation of the fabricating method according to the first embodiment of the present invention. However, by replacing the liquid phase material by the microcapsules in spin-coating the organic resin on the overcoat layer 113, the liquid crystal display device according to the second embodiment of the present invention can be fabricated.

The TFT array substrate is fabricated in a following manner. A metal such as Mo, Al, Cr and the like is deposited on an entire surface of the second substrate 120 by sputtering. The deposited metal is patterned by photolithography to form a plurality of the gate lines 121 and the gate electrode 121a protruding from each of the gate lines 121. By the same process, the common line 127 is formed parallel to the gate line 121 and the common electrode 127a protruding from the common line 127 in the zigzag pattern is formed in the pixel area together.

Subsequently, an insulator such as $SiN_x$ and the like is deposited on the second substrate 120 including the gate line 121 and the like to form the gate insulating layer 125. A semiconductor material (amorphous silicon layer, doped silicon layer) is deposited on the gate insulating layer 125 and is then patterned to form the semiconductor layer 124. In this case, the semiconductor layer 124 is formed by sequentially depositing an amorphous silicon layer and a heavily doped p-type (or n-type) silicon layer and patterning the amorphous and p-type (or n-type) silicon layers.

A metal such as Mo, Al, Cr and the like is deposited over the substrate by sputtering. The deposited metal is patterned by photolithography to form the data line 122 in a direction vertical to the gate line 121 and the source and drain electrodes 122a and 122b in the vicinity of both sides of the semiconductor layer 124, respectively. In this case, the source electrode 122a is formed to protrude from the data line 122. In patterning the source/drain electrodes, the doped silicon layer between the source and drain electrodes 122a and 122b is removed.

Subsequently, a passivation layer 126 containing an inorganic material such as $SiN_x$ or the like is deposited over the substrate including the source and drain electrodes 122a and 122b by CVD (chemical vapor deposition). Alternatively, to enhance an opening ratio of a liquid crystal cell, an organic material having a low dielectric constant such as BCB (benzocyclobutene), SOG (spin-on-glass), acryl and the like may be used as the passivation layer 126.

A portion of the passivation layer 126 on the drain electrode 122b is selectively etched to form a contact hole that exposes a portion of the drain electrode 122b. A transparent conductive layer is deposited on the passivation layer 126 including the contact hole by sputtering to be electrically connected to the drain electrode 122b via the contact hole. The transparent layer is then selectively removed to remain on the pixel area only so that the zigzag shaped pixel electrodes 123 are formed on the pixel area to alternate with the common electrode 127.

Subsequently, although not shown in the drawing, an alignment layer is formed on an entire surface of the second substrate 120 opposing the first substrate 110 having the column spacer 130 formed thereon. Rubbing is then carried out on the alignment layer to create an initial alignment direction for the liquid crystals between the first and second substrates 110 and 120.

Once the alignment process is completed on the second substrate 120 and the column spacer 130 is formed on the first substrate 110, the first and second substrates 110 and 120 are cleaned. Subsequently, liquid crystals are dropped on a display area of either the first or second substrate 110 or 120. A seal pattern is formed on a periphery of a display area of the other substrate using a dispenser. Alternatively, the liquid crystals and seal pattern can be formed on either the first or second substrate 110 or 120.

The substrate on which the liquid crystals are not dropped is turned over to confront the other substrate. The first and second substrates 110 and 120 are aligned to oppose each other and are bonded together by pressurization. The seal pattern is then hardened by UV irradiation or the like. The bonded substrates are cut and processed into unit LCD panels. Thereafter, exterior and electric failure tests are carried out on the processed unit LCD panel to fabricate the liquid crystal display device.

Figure 9:
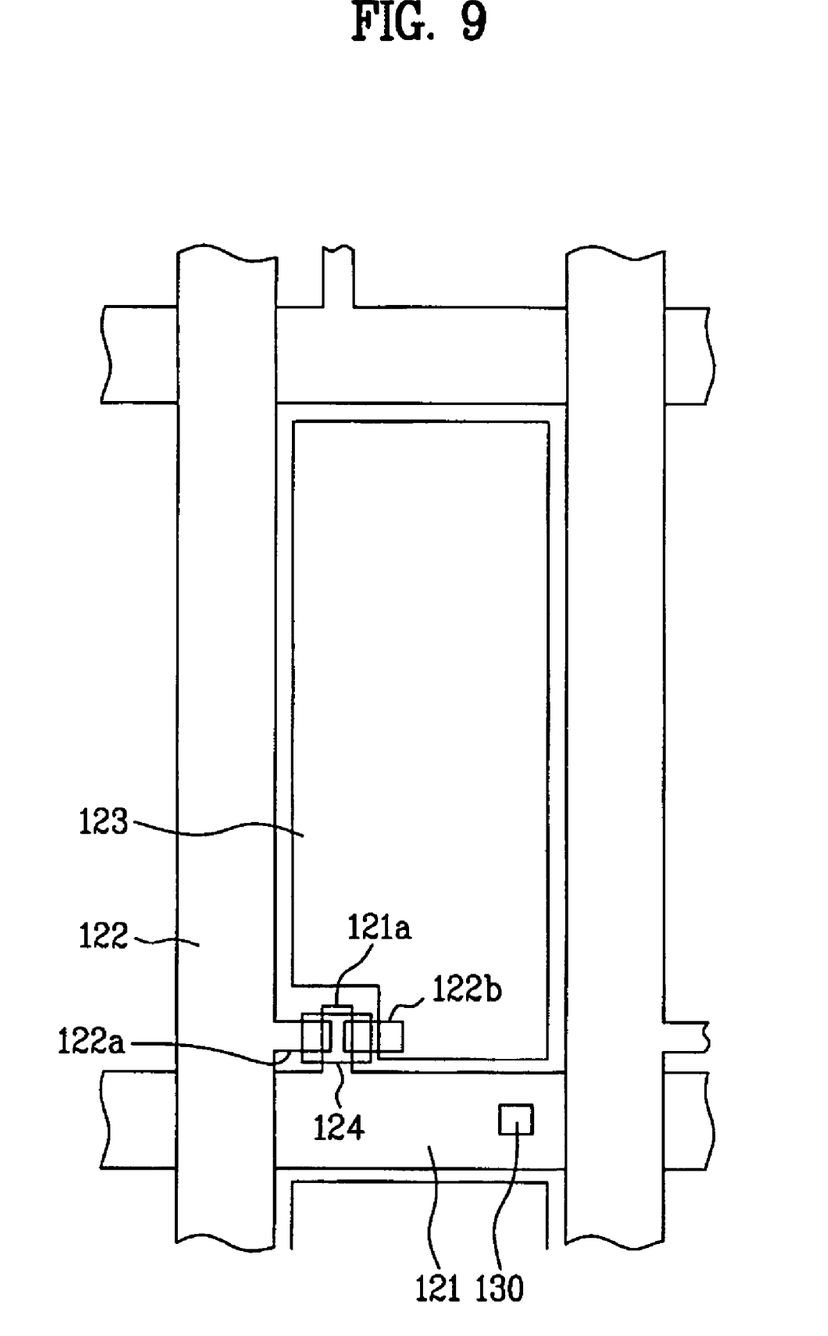
FIG. 9 is a layout of a liquid crystal display device in TN mode according to the present invention.

FIG. 9 is a layout of a liquid crystal display device in TN mode according to the present invention.

Referring to FIG. 9, a TN mode liquid crystal display device mode according to the present invention includes a first substrate 110, a second substrate 120, and a liquid crystal layer 150 provided between the first and second substrates 110 and 120. In this case, the first and second substrates 110 and 120 are bonded together to have a predetermined gap therebetween.

In the TN mode liquid crystal display device, an overcoat layer on the first substrate 110 is replaced by a common electrode and the common electrode is not formed within a pixel area on the second substrate 120. A pixel electrode 123 has a size corresponding to that of the pixel area defined by gate and data lines vertically crossing each other. The remaining parts of the TN mode liquid crystal display device are similar to those of the IPS mode liquid crystal display. Specifically, in a cross-section passing through the gate line, over which the column spacer is formed, the TN mode liquid crystal display device and the IPS mode liquid crystal display are the similar, differing only in that the overcoat layer of the IPS mode liquid crystal display device is replaced by the common electrode. Hence, the same configuration and fabricating method will not be explained in the following.

In the embodiments described herein, the organic resin forming the column spacer contains liquid phase material or microcapsules. The thermal expansion coefficient of the column spacer is substantially equal to or greater than that of the liquid crystals between the substrates. Hence, even if the LCD panel in a high temperature environment, the expansion takes place evenly across the entire area of the LCD panel. This permits the LCD panel to maintain a uniform cell gap. Hence, the gravity failure caused by the temperature rise can be mitigated in the portion of the LCD panel in the vicinity of the ground.

Since the thermal expansion coefficient of liquid is higher than solid and gas is higher than liquid and the liquid crystals between the substrates have an intermediate physical property between liquid and solid, the liquid crystals between the substrates have a thermal expansion coefficient lower than that of a normal liquid. Accordingly, numerous materials (liquid, gaseous or a combination thereof) having a thermal expansion coefficient similar to or higher than that of the liquid crystals are available to use as the material mixed within the organic resin, independent of whether the material is encapsulated within the organic resin. The materials may be dispersed randomly throughout the resin, in a periodic or semiperiodic manner, or in clusters, depending on the material used and the manner of fabrication of the spacer.

It will be apparent to those skilled in the art that various modifications and variations can be made in the present invention without departing from the spirit or scope of the inventions. For example, the materials used in the LCD may be combined, as desired, and the various layers may be single or multiple layer structures. Thus, it is intended that the present invention covers the modifications and variations of this invention provided they come within the scope of the appended claims and their equivalents.

What is claimed is:

1. A liquid crystal display device comprising:
    a first substrate having a plurality of gate lines and data lines crossing each other;
    a second substrate having a black matrix to correspond to the gate lines and the data lines, the second substrate opposing the first substrate to be spaced apart from the first substrate with a prescribed gap;
    liquid crystals in the gap between the first and second substrates; and
    a spacer corresponding to the gate line, the spacer being planarily in contact with both first and second substrates for maintaining cell gap of the liquid crystals, the spacer comprising an organic resin and a liquid phase material dispersed within the organic resin, wherein the liquid phase material has a thermal expansion coefficient substantially greater than that of the liquid crystals.

2. The liquid crystal display device of claim 1, wherein the organic resin is a photo-hardened resin.

3. The liquid crystal display device of claim 1, wherein the liquid phase material is encapsulated in microcapsules such that in each microcapsule a wall material surrounds the liquid phase material.

4. The liquid crystal display device of claim 1, wherein the microcapsules have a thermal expansion coefficient substantially Of greater than that of the liquid crystals.

5. A liquid crystal display device comprising:
    a first substrate having a plurality of gate lines and data lines crossing each other;
    a second substrate having a black matrix to correspond to the gate lines and the data lines, the second substrate opposing the first substrate to be spaced apart from the first substrate with a prescribed gap;
    first liquid crystals in the gap between the first and second substrates, the first liquid crystals having a first thermal expansion coefficient; and
    a spacer corresponding to the gate line, the spacer being planarily in contact with both first and second substrates for maintaining cell gap of the liquid crystals, the spacer comprising an organic resin and second liquid crystals having a second thermal expansion coefficient, wherein the second liquid crystals are dispersed within the organic resin and wherein the second thermal expansion coefficient is substantially greater than the first thermal expansion coefficient.

6. The liquid crystal display device of claim 5, wherein the organic resin is a photo-hardening resin.

7. The liquid crystal display device of claim 5, wherein the second liquid crystals have a thermal expansion coefficient substantially equal to or smaller than that of the first liquid crystals.

8. The liquid crystal display device of claim 5, wherein the second liquid crystals are encapsulated in microcapsules such that in each microcapsule a wall material surrounds the second liquid crystals.

9. The liquid crystal display device of claim 8, wherein the microcapsules have a thermal expansion coefficient substantially greater than that of the first liquid crystals.

* * * * *

UNITED STATES PATENT AND TRADEMARK OFFICE
CERTIFICATE OF CORRECTION

| | |
|---|---|
| PATENT NO. | : 8,023,091 B2 |
| APPLICATION NO. | : 11/203460 |
| DATED | : September 20, 2011 |
| INVENTOR(S) | : Young Suk Kim |

It is certified that error appears in the above-identified patent and that said Letters Patent is hereby corrected as shown below:

<u>In the Claims</u>

In column 12, claim 4, line 11, before "greater than that of the liquid" delete "Of".

Signed and Sealed this
Third Day of January, 2012

David J. Kappos
*Director of the United States Patent and Trademark Office*